United States Patent [19]
Parduhn

[11] Patent Number: 5,935,478
[45] Date of Patent: Aug. 10, 1999

[54] DEVICE AND METHOD FOR COOKING BACON AND OTHER FLAT STRIPS OF FOOD

[75] Inventor: A. Philip Parduhn, Edmond, Okla.

[73] Assignee: Pelco, Investments, L.L.C., Edmond, Okla.

[21] Appl. No.: 08/877,430

[22] Filed: Jun. 17, 1997

[51] Int. Cl.$^6$ ..................................................... H05B 6/80
[52] U.S. Cl. .......................... 219/733; 219/734; 219/762; 99/444; 99/DIG. 14
[58] Field of Search ..................................... 219/733, 732, 219/734, 735, 725, 762; 99/444, 445, 446, DIG. 14, 451, 349, 400, 425

[56] References Cited

U.S. PATENT DOCUMENTS

| | | | |
|---|---|---|---|
| 92,008 | 6/1869 | Browne | 99/444 |
| 518,243 | 4/1894 | Hailes | 99/444 |
| 3,466,998 | 9/1969 | Musgrove | 99/349 |
| 3,713,379 | 1/1973 | Gordy | 99/349 |
| 4,064,797 | 12/1977 | Forlani | 99/341 |
| 4,140,889 | 2/1979 | Mason, Jr. et al. | 219/733 |
| 4,214,515 | 7/1980 | Kubiatowicz | 99/400 |
| 4,857,342 | 8/1989 | Kappes | 426/107 |
| 4,950,524 | 8/1990 | Hacker | 428/163 |
| 5,552,585 | 9/1996 | Fleck | 219/732 |
| 5,714,740 | 2/1998 | Kelly et al. | 219/732 |

OTHER PUBLICATIONS

Bacon Box®, Product Brochure Time Energy, Inc., Wilmington, Delaware. 19801, published prior to Aug., 1995.

Product Brochure on "Makin Bacon with Armour®", Makin Bacon, P.O. Box 24002, Grand Rapids, MN 55745–2400, published prior to Aug., 1995.

"Bacon Wave" Product Brochure, EMSON, 230 5th Avenue, New York, New York 10001, published prior to Aug., 1995.

Anchor Hocking "Microwave" Product Brochure, Anchor Hocking, St. Paul, MN 55102, published prior to Aug., 1995.

*Primary Examiner*—Philip H. Leung
*Attorney, Agent, or Firm*—Mary M. Lee

[57] ABSTRACT

A device and a method for cooking bacon and other strips of food which lose liquids during the cooking process. The device has a generally rectangular base and cover. The base has an arcuate cooking surface which is gently arched. The base also has a trough surrounding the bottom of the arcuate cooking surface along three sides for collecting the cooking liquids. The cover has an arcuate portion which conforms to the arcuate surface of the base. A skirt with recessed corners extends from the arcuate portion of the cover along three sides and cooperates with the trough in the base. Cooking liquids may be poured from the trough through pour spouts formed in the corners of the base in cooperation with the recessed corners in the cover. The device is held together by a fastening device which locks the cover to the base. A pair of handles formed along two sides of the base provide ease in handling the device and in pouring cooking liquids from the base. The method of the invention includes placement of strips of food on an arcuate cooking surface. The present invention produces evenly cooked, more healthful food and prevents curling and twisting of the strips.

41 Claims, 4 Drawing Sheets

« 5,935,478 »

DEVICE AND METHOD FOR COOKING BACON AND OTHER FLAT STRIPS OF FOOD

FIELD OF THE INVENTION

The present invention relates generally to cooking devices and, more particularly, to devices for cooking bacon and other flat strips of food which lose liquid during the cooking process.

SUMMARY OF THE INVENTION

The present invention is directed to a device for cooking bacon and other flat strips of food which lose liquid during the cooking process. The device comprises a base and a cover. The base is generally rectangular and forms an arcuate cooking surface and a trough peripheral to the arcuate cooking surface. The cover is shaped to conform to the base.

The present invention further is directed to a device for cooking bacon and other flat strips of food which lose liquid during the cooking process and comprises a base and a cover as hereinabove described, wherein the base and cover have four sides. The cover defines an arcuate portion sized and configured to conform to the arcuate cooking surface of the base. Still further, the cover defines a peripheral skirt extending from three sides of the cover in cooperation with the trough in the base. The skirt is sized and configured to cover the trough.

Still further, the present invention is directed to a device for cooking bacon and other flat strips of food and comprises a base and a cover as hereinabove described, wherein the base further comprises at least one pour spout formed at the convergence of the sides of the base and the cover further comprises at least one recessed corner formed at the convergence of the sides of the cover. The number of pour spouts in the base equals the number of recessed corners in the cover. The pour spout in the base cooperates with the recessed corner in the cover. Still further, the base has an open end and a closed end at opposite sides of the arcuate cooking surface, the open end being formed at the side of the base nonadjacent to the trough. The cover defines an open end and a closed end configured to conform to the open end and the closed end of the base. The open ends of the base and the cover respectively form upwardly-extending lips, wherein the lip of the cover is configured to be received inside the lip of the base.

The present invention further is directed to a device for cooking bacon and other flat strips of food and comprises a base and a cover as hereinabove described and a fastener adapted to secure the base to the cover. The base further comprises a handle.

DETAILED DESCRIPTION OF THE PREFERRED EMBODIMENTS

Cooking bacon is a messy and time-consuming task. With many conventional bacon cooking devices, grease splatters the oven and collects in the bottom of the device causing bacon to soak in its own grease. Grease and drippings collect in the corners of conventional cooking devices, which makes for tedious, time-consuming cleanup. Further, bacon can cook unevenly and curl at the edges in conventional devices.

The bacon cooking device of the present invention eliminates the mess and time required when cooking bacon and other strips of food and produces evenly cooked strips of food which are flat and drained of cooking liquids. The cooking device of this invention provides an arcuate cooking surface which is gently sloped for supporting the bacon or other flat strips of food. The arcuate surface configuration produces evenly-cooked food and permits the cooking liquids to drain from the food. The cooking liquids collect in a trough thereby producing dry bacon or other food. The device of the present invention prevents oven splatter by providing a cover which is arcuate in conformance with the cooking surface. The cover holds the strips of food intact during the cooking process and prevents curling of the edges of the food. Recessed edges in the cover cooperate with pour spouts in the base allowing grease and other cooking liquids easily to be poured from the cooking device and disposed of, thus providing for easy cleanup. The device has no sharp corners in which grease may collect. The cooked bacon or other food lifts directly from the arcuate cooking surface in a flat, dry condition.

Figure 1:
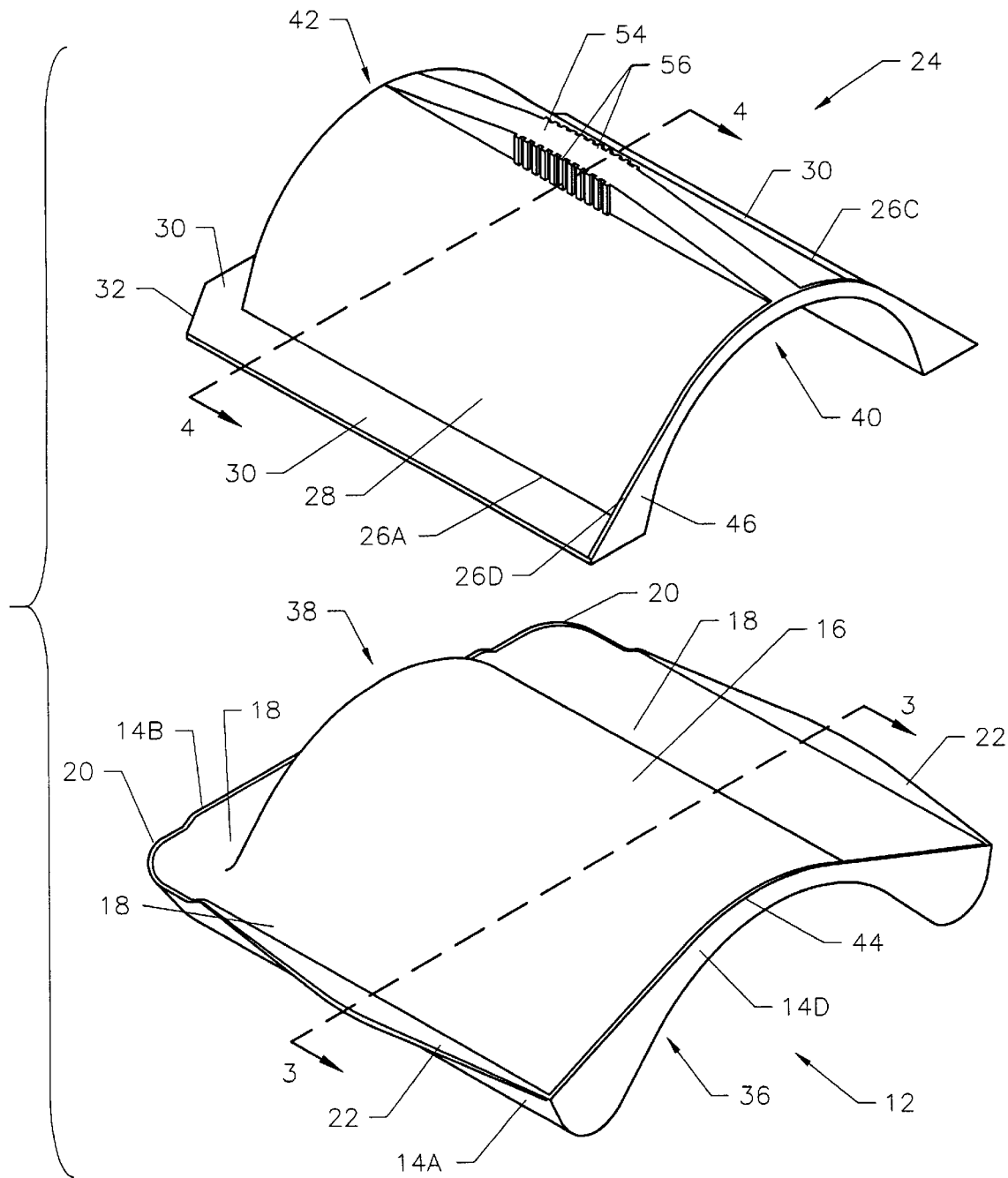
FIG. 1 is an exploded, perspective view from the open end of the device constructed in accordance with the present invention.
Figure 2:
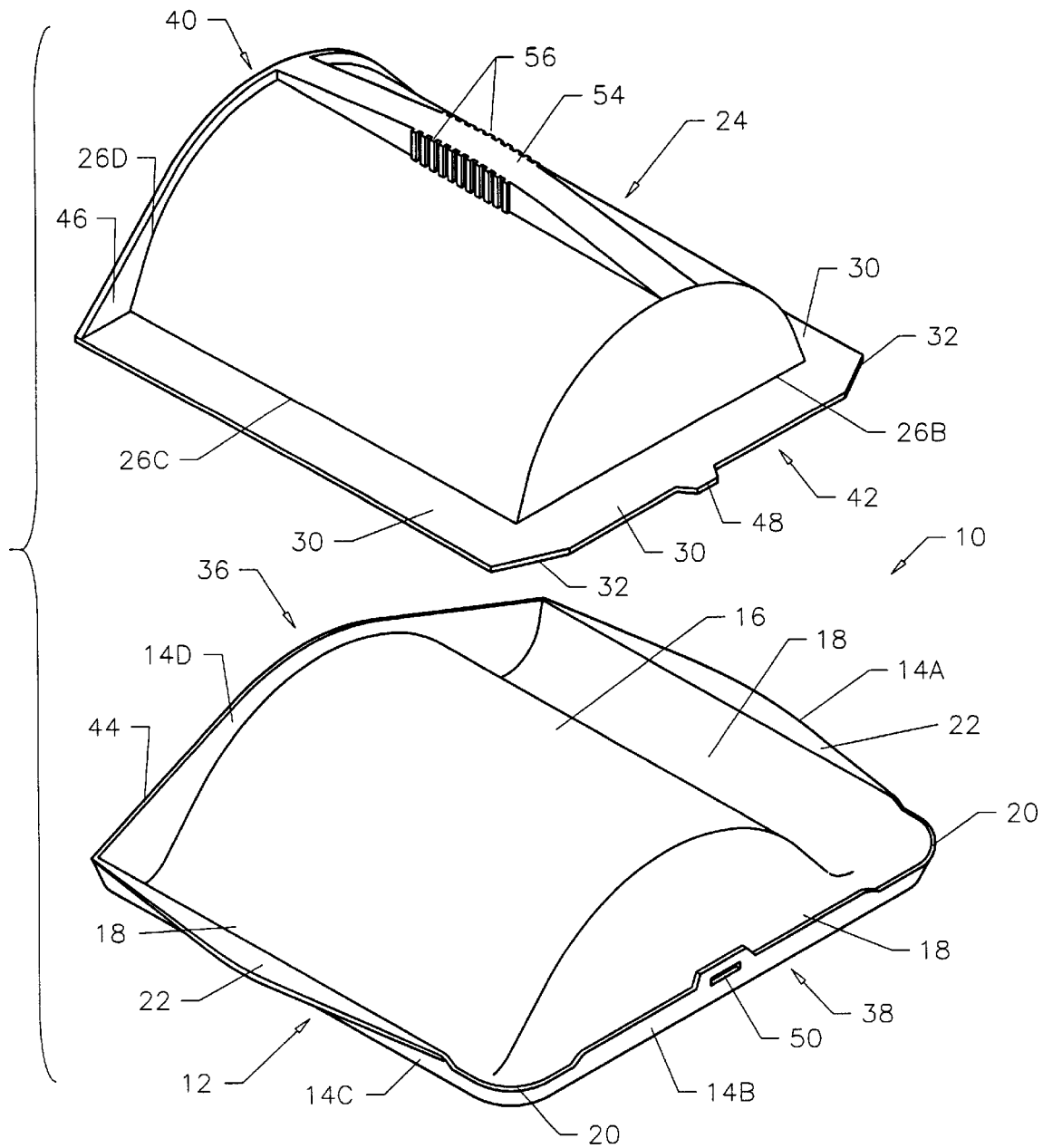
FIG. 2 is an exploded, perspective view from the closed end of the device constructed in accordance with the present invention.

With reference now to the drawings in general and to FIGS. 1 and 2 in particular, there is shown a device for cooking bacon, and other strips of food which lose liquid during the cooking process, the device being constructed in accordance with the present invention and designated generally by the reference numeral 10. The device is comprised of a generally rectangular base 12 having four sides, 14A, 14B, 14C and 14D, and an arcuate cooking surface 16.

Figure 3:
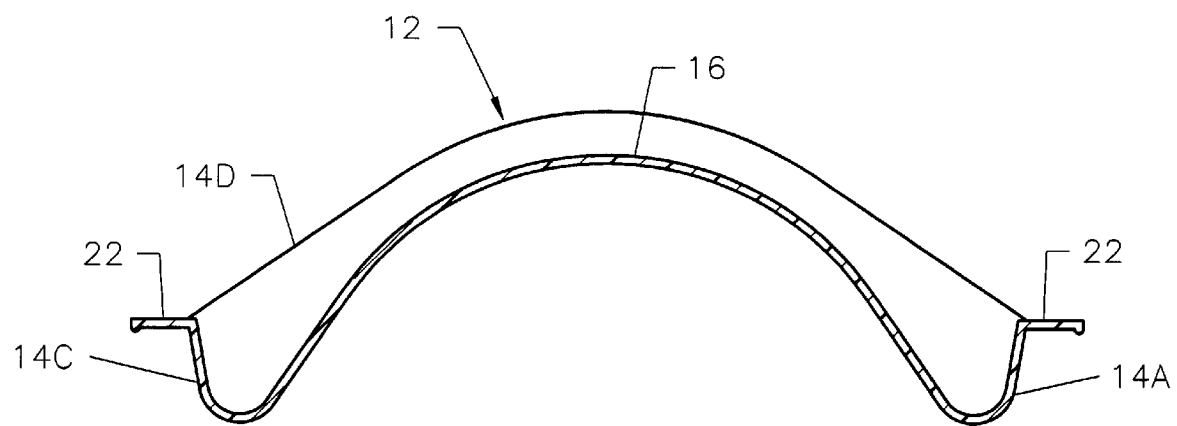
FIG. 3 is a cross-sectional view of the base taken along line 3—3 of FIG. 1 as viewed from the closed end of the base.

The arcuate cooking surface 16 is gently sloped so as to create an obtuse arch in the cooking configuration. The gentle slope of the arcuate cooking surface 16 is illustrated in cross section in FIG. 3. The arcuate cooking portion supports the bacon or other flat strips of food in an arcuate configuration so that cooking liquids drain from the food during the cooking process, yet is gently sloped so that cooked foods lie flat when removed while still warm from the device. The cooking liquids drain from the foods and collect in the base in a manner yet to be described, thus producing evenly-cooked, drier, more healthful foods.

Returning to FIGS. 1 and 2, the base 12 defines a trough 18 which is peripheral to the arcuate cooking surface 16 along three sides, 14A, 14B and 14C, of the base 12. It will now be appreciated that grease and other cooking liquids drain into the trough 18 during the cooking process producing a drier, more healthful food. Preferably, at least one pour spout 20 is formed at the convergence of the sides, 14A and 14B or 14B and 14C, of the base 12 adapted to pour liquids from the trough 18. The pour spouts 20 preferably are rounded to facilitate cleaning of the base 12.

The base 12 of the preferred embodiment forms a handle for ease of use of the device. In one preferred embodiment, the handle comprises a pair of opposing flanges 22 extending peripherally from the base 12. However, it will be appreciated that any number of handles may be substituted for the opposing flanges 22 formed in the base 12. The flanges 22 permit a user to securely grasp the device 10 during transport between oven and table, thus reducing the risk of dropping the device.

Figure 4:
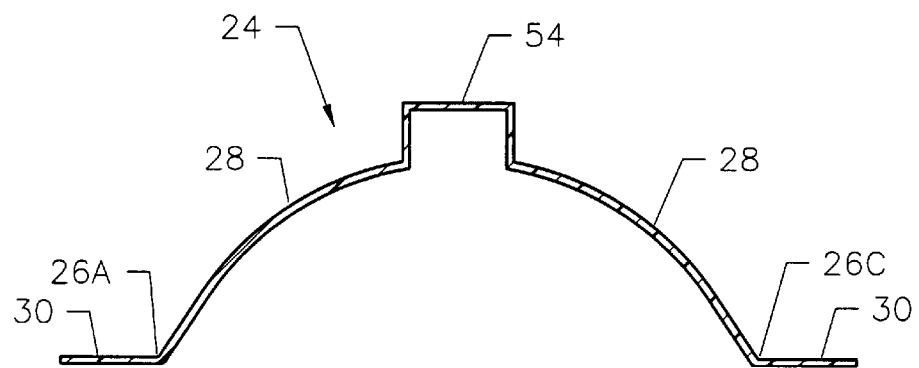
FIG. 4 is a cross-sectional view of the cover taken along line 4—4 of FIG. 1 as viewed from the closed end of the cover.

With continuing reference to FIGS. 1 and 2, the device 10 further comprises a cover 24 shaped to conform to the base 12. The cover 24 is generally rectangular having four sides, 26A, 26B, 26C and 26D, and a gently sloped arcuate portion 28 sized and configured to conform to the arcuate cooking surface 16 of the base 12. The gently sloped arcuate portion 28 of the cover 24 is illustrated in cross section in FIG. 4. The cover 24 holds the strips of food intact and presses the food against the arcuate portion 16 of the base 12, which eliminates curling of bacon. Further, oven splatter is minimized in that the cover retains the cooking liquids in the device. The cover 24 preferably is transparent to permit viewing of the foods during the cooking process without removal of the cover from the base 12.

Returning again to FIGS. 1 and 2, the cover 24 preferably further comprises a peripheral skirt 30 extending from three sides, 26A, 26B and 26C, thereof. The skirt 30 is sized and configured to cover the trough 18 and to cooperate therewith when pouring cooking liquids from the device 10.

Figure 5:
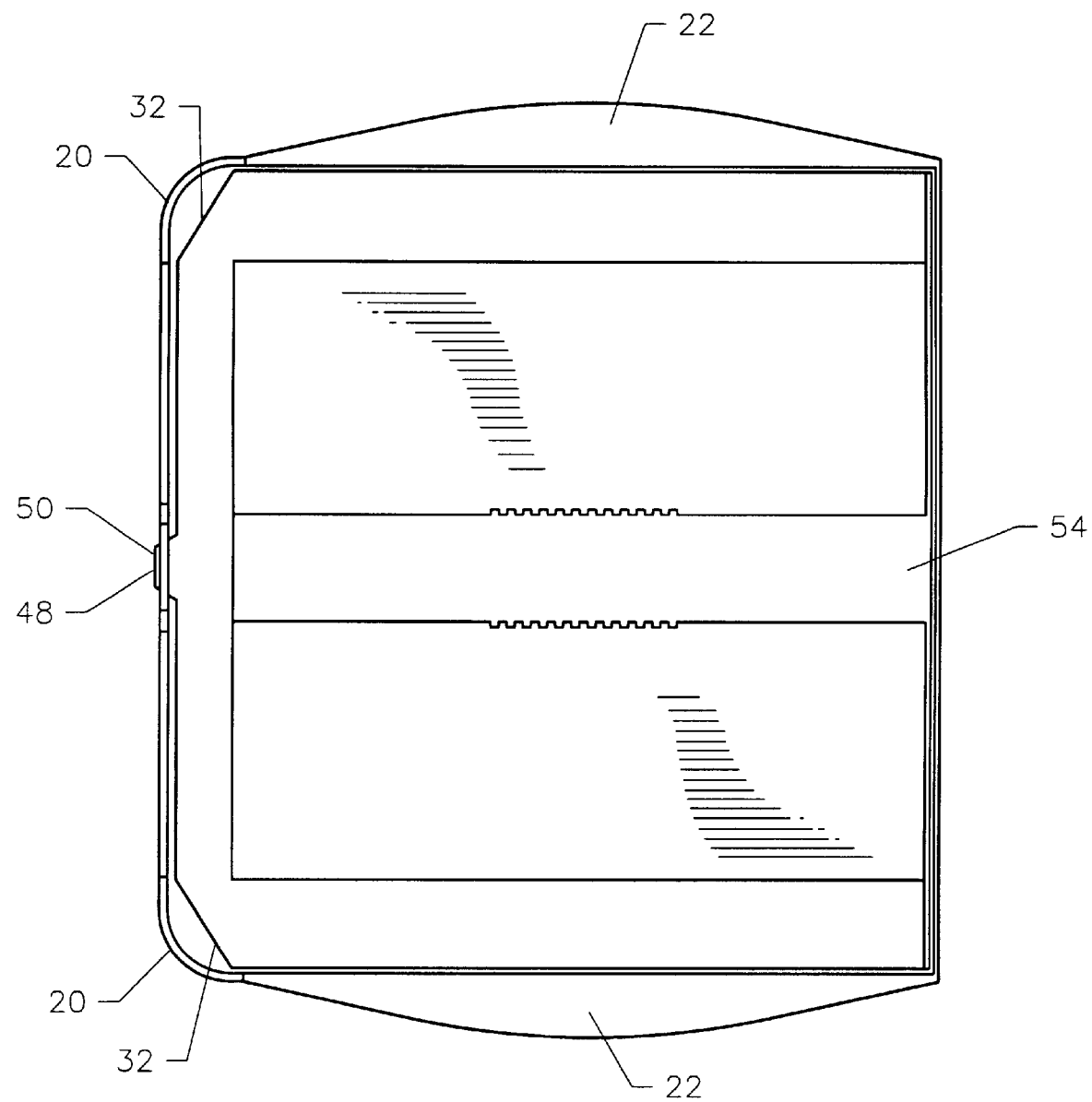
FIG. 5 is a top plan view of the base and the cover in assembled relationship.

Preferably, the skirt 30 defines at least one recessed corner 32 at the convergence of sides 26A and 26B or 26B and 26C. The recessed corner 32 cooperates with the pour spout 20 to permit disposal of the cooking liquids while holding the strips of food intact with the cover 24. It will be appreciated that the recessed corner 32 of the cover 24 may be formed in a number of ways to permit the user to pour cooking liquids from the base. For example, corner 32 may be beveled, as shown in FIGS. 1, 2 and 5, or radiused to create a crescent moon shape. Any corner 32 configuration permitting cooking liquids to be poured from the device 10 will suffice.

Ideally, the number of recessed corners 32 is equal to the number of pour spouts 20. The working relationship of the recessed corner 32 with the pour spout 20 is illustrated in FIG. 5 wherein the base 12 and the cover 24 are shown in assembled relation.

With continuing reference to FIGS. 1 and 2, the base preferably defines an open end 36 and a closed end 38. The open end 36 is formed at side 14D of the base 12. The closed end 38 is formed opposite the open end 36 at side 14B of the base 12. The cover 24 preferably defines an open end 40 and a closed end 42 configured to conform, respectively, to the open end 36 and the closed end 38 of the base 12. The open end 40 is formed at side 26D of the cover 24. The closed end 42 is formed opposite the open end 40 at side 26B. FIG. 1 depicts the open end configuration of the device 10. The closed end configuration of the device 10 is illustrated in FIG. 2.

With continuing reference to FIGS. 1 and 2, the open end 36 of the base 12 forms an upwardly-extending lip 44. The open end 40 of the cover 24 forms a lip 46 configured to be received inside the lip 44 of the base 12.

A fastener secures the cover 24 to the base 12 when in assembled relation. As shown in FIGS. 2 and 5, an interlocking tab 48 is formed on one side of the cover 24. The tab 48 is configured to be received inside slot 50 formed in one side of the base 12. The fastener secures the cover 24 to the base 12 thereby facilitating convenient removal with one hand of the device 10 from the oven. The interlocking tab 48 of the preferred embodiment may be substituted by any alternative fastening means, such as a latching device, which is sufficient to secure the cover 24 to the base 12 when in assembled relation.

The cover 24 further defines a handle 54 which preferably comprises a gripping device 56 adapted to aid in securely handling the cover. One preferred gripping device 56 comprises a plurality of ridge-like projections of standard or varying relief formed in the handle. Alternatively, the gripping device 56 may comprise a coating of a composition characterized by the ability to resist slippage, such as a rubber-based compound. Any gripping devices 56 sufficient to aid in the secure handling of the cover 24 will suffice.

In the preferred embodiment, the base 12 and the cover 24 each are integrally formed. The base 12 and the cover 24 preferably are comprised of a microwave-compatible material.

In accordance with the method of the present invention, bacon or other flat strips of food are supported in an arcuate cooking configuration. The food is then covered with a surface which conforms to the arcuate cooking configuration. The food is then cooked, during which time the liquids from the food are collected in a liquid receiving trough. The liquids are drained from the liquid receiving trough after the food is cooked.

Changes may be made in the combination and arrangement of the various parts, elements, steps and procedures described herein without departing from the spirit and scope of the invention as defined in the following claims.

What is claimed is:

1. A device for cooking bacon and other flat strips of food which lose liquid during the cooking process, comprising:
    a base forming an arcuate cooking surface and a trough, wherein the trough is peripheral to the arcuate cooking surface; and
    a cover having an arcuate portion shaped to conform to the arcuate cooking surface of the base and a peripheral skirt extending from the arcuate portion, the skirt being sized and configured to cover the trough;
    whereby when the cover is placed on the base, the arcuate portion of the cover rests upon the arcuaate cooking surface of the base so that flat strips of food placed on the arcuate cooking surface will be appressed by the cover during cooking.

2. The device of claim 1 wherein the base is integrally formed.

3. The device of claim 1 wherein the base has four sides and forms a pour spout at the convergence of two of the sides of the trough.

4. The device of claim 3 wherein the skirt further comprises at least one recessed corner which cooperates with the pour spout in the base, wherein the number of recessed corners equals the number of pour spouts.

5. The device of claim 1 wherein the cover is integrally formed.

6. The device of claim 1 wherein the cover is transparent.

7. The device of claim 1 wherein the base is generally rectangular and wherein the trough is formed along three sides of the base and wherein the base further defines an open end and a closed end, the open end being formed at the side of the base nonadjacent to the trough and the closed end being formed along the side of the base opposite the open end.

8. The device of claim 7 wherein the cover further defines an open end and a closed end configured to conform to the open end and the closed end of the base.

9. The device of claim 8 wherein the open end of the base forms an upwardly-extending lip and the open end of the cover forms a lip configured to be received inside the lip of the base.

10. The device of claim 1 wherein the base and the cover are formed of microwave-compatible material.

11. The device of claim 1 wherein the base further comprises a handle.

12. The device of claim 1 further comprising a fastener adapted to secure the cover to the base.

13. The device of claim 12 wherein the fastener comprises an interlocking tab formed on one side of the cover, the tab configured to be received in a slot formed in the base.

14. A device for cooking bacon and other flat strips of food which lose liquid during the cooking process, comprising:
- a generally rectangular base comprising:
  - an arcuate cooking surface;
  - four sides; and
  - a trough;
  - wherein the trough is peripheral to the arcuate cooking surface along three sides of the base; and
- a generally rectangular cover comprising:
  - a top surface;
  - a bottom surface;
  - four sides;
  - an arcuate portion sized and configured to conform to the arcuate cooking surface of the base; and
  - a peripheral skirt extending from the arcuate portion along three sides thereof in cooperation with the trough, the skirt being sized and configured to cover the trough.

15. The device of claim 14 wherein the base is integrally formed.

16. The device of claim 14 wherein the base forms at least one pour spout, the pour spouts being formed at the convergence of the sides of the trough.

17. The device of claim 14 wherein the cover is integrally formed.

18. The device of claim 14 wherein the cover is transparent.

19. The device of claim 14 wherein the skirt further comprises at least one recessed corner which cooperates with the pour spout in the base, wherein the number of recessed corners equals the number of pour spouts.

20. The device of claim 14 wherein the base further defines an open end and a closed end, the open end being formed at the side of the base nonadjacent to the trough and the closed end being formed along the side of the base opposite the open end.

21. The device of claim 20 wherein the cover further defines an open end and a closed end configured to conform to the open end and the closed end of the base.

22. The device of claim 21 wherein the open end of the base forms an upwardly-extending lip and the open end of the cover forms a lip configured to be received inside the lip of the base.

23. The device of claim 14 wherein the base and the cover are formed of microwave-compatible material.

24. The device of claim 14 wherein the base further comprises a handle.

25. The device of claim 14 further comprising a fastener adapted to secure the cover to the base.

26. The device of claim 25 wherein the fastener comprises an interlocking tab formed on one side of the cover, the tab configured to be received in a slot formed in the base.

27. A device for cooking bacon and other flat strips of food which lose liquid during the cooking process, comprising:
- a generally rectangular base comprising:
  - an arcuate cooking surface;
  - four sides;
  - a trough; and
  - at least one pour spout formed at the convergence of the sides of the base;
  - wherein the trough is peripheral to the arcuate cooking surface along three sides of the base; and
- a generally rectangular cover comprising:
  - a top surface;
  - a bottom surface;
  - four sides;
  - an arcuate portion configured to conform to the cooking surface of the base;
  - a peripheral skirt extending from the arcuate portion along three sides thereof, the skirt being sized and configured to cover the trough in the base; and
  - at least one recessed corner formed at the convergence of the sides of the cover and which cooperates with the pour spout in the base;
- wherein the number of pour spouts in the base is equal to the number of recessed corners in the cover;
- wherein the base defines an open end and a closed end, the open end being formed along the side of the base nonadjacent to the trough and forming an upwardly-extending lip and the closed end being formed along the side of the base opposite the open end; and
- wherein the cover further defines an open end and a closed end configured to conform to the open end and the closed end of the base, the open end of the cover forming an upwardly-extending lip configured to be received inside the lip of the base.

28. The device of claim 27 wherein the base is integrally formed.

29. The device of claim 27 wherein the cover is integrally formed.

30. The device of claim 27 wherein the base and the cover are formed of microwave-compatible material.

31. The device of claim 27 wherein the base further comprises a handle.

32. The device of claim 27 further comprising a fastener adapted to secure the cover to the base.

33. The device of claim 27 wherein the fastener comprises an interlocking tab formed on one side of the cover, the tab configured to be received in a slot formed in the base.

34. A device for cooking bacon and other flat strips of food which lose liquid during the cooking process, comprising:
- a generally rectangular base comprising:
  - an arcuate cooking surface;
  - four sides;
  - a trough, wherein the trough is peripheral to the arcuate cooking surface along three sides of the base;
  - at least one pour spout formed at the convergence of the sides of the base; and
  - a handle;
- a generally rectangular cover comprising:
  - a top surface;
  - a bottom surface;
  - an arcuate portion configured to conform to the cooking surface of the base;
  - a peripheral skirt extending from the arcuate portion along three sides thereof, the skirt being sized and configured to cover the trough in the base; and
  - at least one recessed corner formed at the convergence of the sides of the cover and which cooperates with the pour spout in the base; and
- a fastener adapted to secure the base to the cover;

wherein the number of pour spouts in the base is equal to the number of recessed corners in the cover;

wherein the base defines an open end and a closed end, the open end being formed along the side of the base nonadjacent to the trough and forming an upwardly-extending lip and the closed end being formed along the side of the base opposite the open end;

wherein the cover further defines an open end and a closed end configured to conform to the open end and the closed end of the base, the open end of the cover forming an upwardly-extending lip configured to be received inside the lip of the base.

35. The device of claim 34 wherein the base is integrally formed.

36. The device of claim 34 wherein the cover is integrally formed.

37. The device of claim 34 wherein the base and the cover are formed of microwave-compatible material.

38. The device of claim 34 wherein the fastener comprises an interlocking tab formed on one side of the cover, the tab configured to be received in a slot formed in one side of the base.

39. The device of claim 34 wherein the handle of the base comprises a pair of opposing flanges extending peripherally from two sides of the base.

40. The device of claim 34 wherein the cover of the handle further comprises a gripping member adapted to aid in securely handling the cover.

41. The device of claim 40 wherein the gripping member comprises a plurality of ridge-like projections of varying relief formed in the handle.

* * * * *